United States Patent [19]

Price, Jr. et al.

[11] Patent Number: 5,346,079
[45] Date of Patent: Sep. 13, 1994

[54] DATA STORAGE MEDIA CAROUSEL

[75] Inventors: Macy J. Price, Jr., Louisville; Timothy J. Pickles, Brighton, both of Colo.

[73] Assignee: Engineered Data Products, Inc., Broomfield, Colo.

[21] Appl. No.: 21,692

[22] Filed: Feb. 23, 1993

[51] Int. Cl.⁵ .................................. A47F 5/00
[52] U.S. Cl. .................... 211/131; 211/163; 211/194; 312/9.46
[58] Field of Search .................. 211/40, 41, 163, 131, 211/194, 188, 42; 312/9.46, 9.9, 9.31, 9.45, 249.2, 135

[56] References Cited

U.S. PATENT DOCUMENTS

| | | | |
|---|---|---|---|
| 3,543,943 | 12/1970 | Joy et al. | 211/163 X |
| 3,736,036 | 5/1973 | Mathus | 312/9.46 X |
| 3,862,787 | 1/1975 | Hilsinger | 312/9.46 X |
| 3,889,817 | 6/1975 | Berkman | 211/163 |
| 4,140,223 | 2/1979 | Rau et al. | 211/78 |
| 4,802,587 | 2/1989 | Armijo et al. | 211/40 X |
| 5,024,168 | 6/1991 | Stravitz | 312/249.2 X |
| 5,176,264 | 1/1993 | DePalma | 211/40 |

Primary Examiner—Robert W. Gibson, Jr.
Attorney, Agent, or Firm—Glenn L. Webb

[57] ABSTRACT

A rotatable carousel for storing a variety of rear suspended data storage media holders. This carousel includes a base unit having a base member rotatably affixed thereto. A plurality of modular compartment units are securely stacked ont top of one another by engagement with the upper portions of a lower modular unit with the lower portion of an upper modular unit. The lowermost modular unit is affixed by screws to the base member. This causes all of the stacked modular units to rotate relative to the base unit. A top plate is mounted onto the uppermost modular unit.

Compartments are formed in each of the modular units. Apertures in the rear wall of the compartments engage the rear suspension members of the data storage media holders. This provides an efficient and compact storage systems, particular for staging sites.

5 Claims, 3 Drawing Sheets

DATA STORAGE MEDIA CAROUSEL

BACKGROUND OF THE INVENTION

1. Field of the Invention

This invention relates to the field of storage systems for data storage media such as tape cartridges and optical disks, and particularly to the field of carousel storage systems.

2. Statement of the Problem

Large information systems often require off-site data media storage, such as in the form of tape cartridges and optical disks. Such data storage media is often stored in off-site rack systems, such as the Extreme Density ™ Storage System, manufactured by Engineered Data Products, Inc., Broomfield, Colo. In some situations, particularly when the data storage media is being "staged" for entry into or retrieval from an information system, such as a mainframe computer or automated cartridge library system, a smaller storage system is necessary.

Examples of the prior data storage media systems for staging include carousels, such as the Stationary Staging Rack, and the Super Carousel, both manufactured by Engineered Data Products, Inc., Broomfield, Colo. and the Mega Rack'N Pack, manufactured by Wright Line, Worcester, Mass. These systems are designed primarily for staging 3480/3490 style magnetic tape cartridges.

Additional styles of data storage media gaining acceptance include eight millimeter (8 mm) tape cartridges, four millimeter (4 mm) tape cartridges, five one-quarter (5¼ inch optical disks, and three one-half (3½) inch optical disks. Other data storage media will likely be developed as advances in technology occur.

The present carousel systems are not designed to accommodate these additional styles of data storage media. Therefore, new styles of storage systems are being specifically designed to meet the requirements of these styles of data storage media. Thus, a new line of storage rack systems must be purchased and installed for every change in data storage media or change in the media holders. This can be a major expense, particularly when the change in data media storage is in a transitional phase. Several styles of data storage media may be in use at a particular site. Presently a plurality of differing storage rack systems are required to accommodate the various styles of data storage media. Also, the older storage rack systems become outdated and useless as the particular data storage media stored therein is phased out.

An additional problem occurs from configuring existing space requirements for the storage rack systems. An end-user of these products must choose between two sizes of carousels. This typically creates a problem with either under-capacity or over-capacity in the staging or storage areas.

Presently, a problem exists in that there is no existing data storage media carousel system that can be easily configured and/or adapted to hold most popular styles of data storage media and to be adapted to an appropriate capacity level.

SUMMARY OF THE INVENTION

The present invention solves these problems and others by providing a storage system for data storage media that is easily adapted for capacity and use. The storage system in one preferred embodiment of the present invention includes a rotatable carousel for storing a variety of rear suspended data storage media holders similar to the holders manufactured by Engineered Data Products, Inc., Broomfield, Colo.

The rotatable carousel of this preferred embodiment includes a base unit having pedestal feet. A base member is rotatably affixed to the base unit. Roller ball bearings sandwiched between the base unit and base member. A plurality of modular compartment units are securely stacked ont top of one another by engagement with the upper portions of a lower modular unit with the lower portion of an upper modular unit. The lowermost modular unit is affixed by screws to the base member. This causes all of the stacked modular units to rotate relative to the base unit. A top plate is mounted onto the uppermost modular unit.

Compartments are formed in each of the modular units. Apertures in the rear wall of the compartments engage the rear suspension members of the data storage media holders. This provides an efficient and compact storage systems, particular for staging sites.

These and other features will be evident from the ensuing detailed description of a preferred embodiment and from the drawings.

DETAILED DESCRIPTION OF A PREFERRED EMBODIMENT

Figure 1:
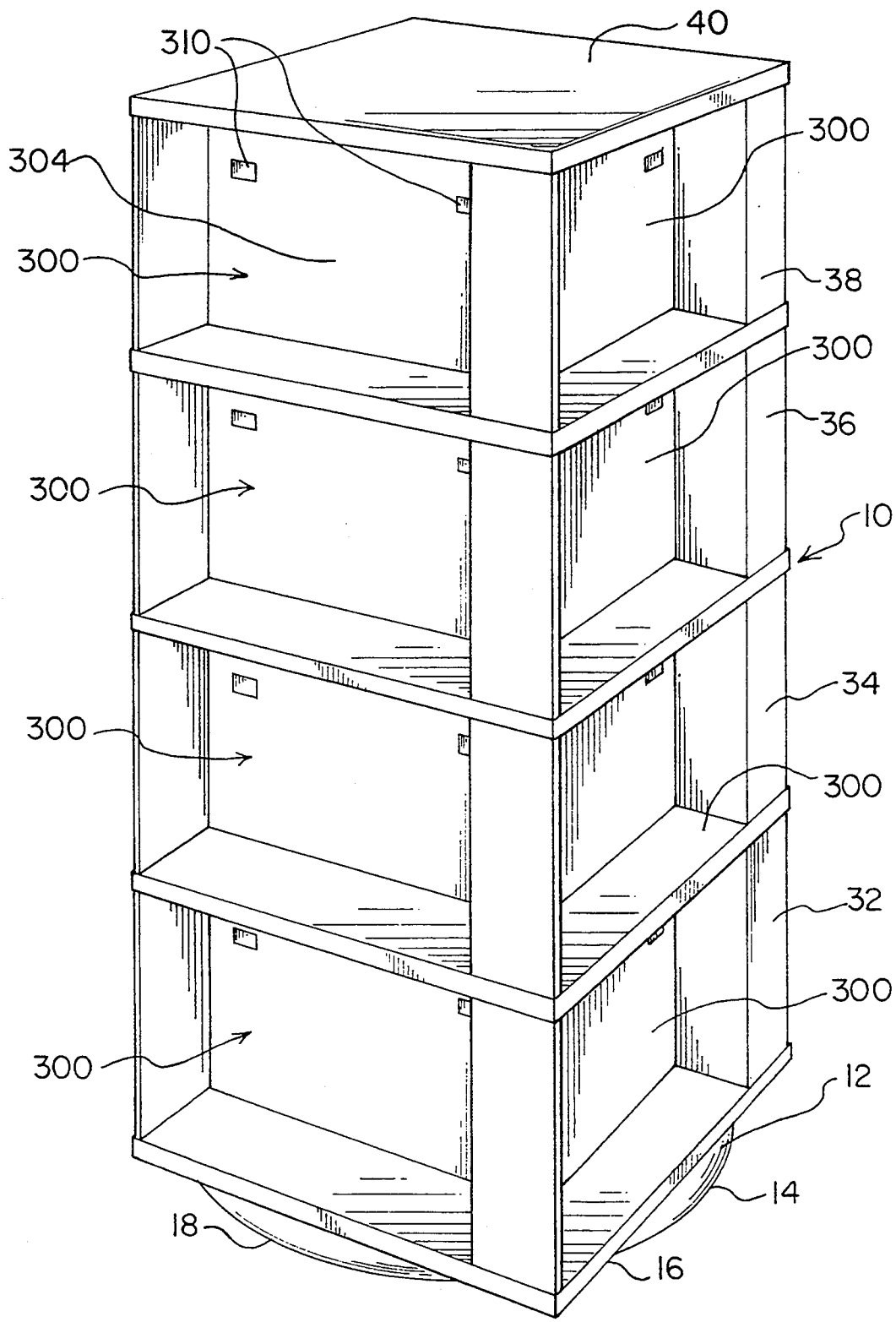
FIG. 1 is a perspective view of the rotatable carousel of a preferred embodiment.
Figure 2:
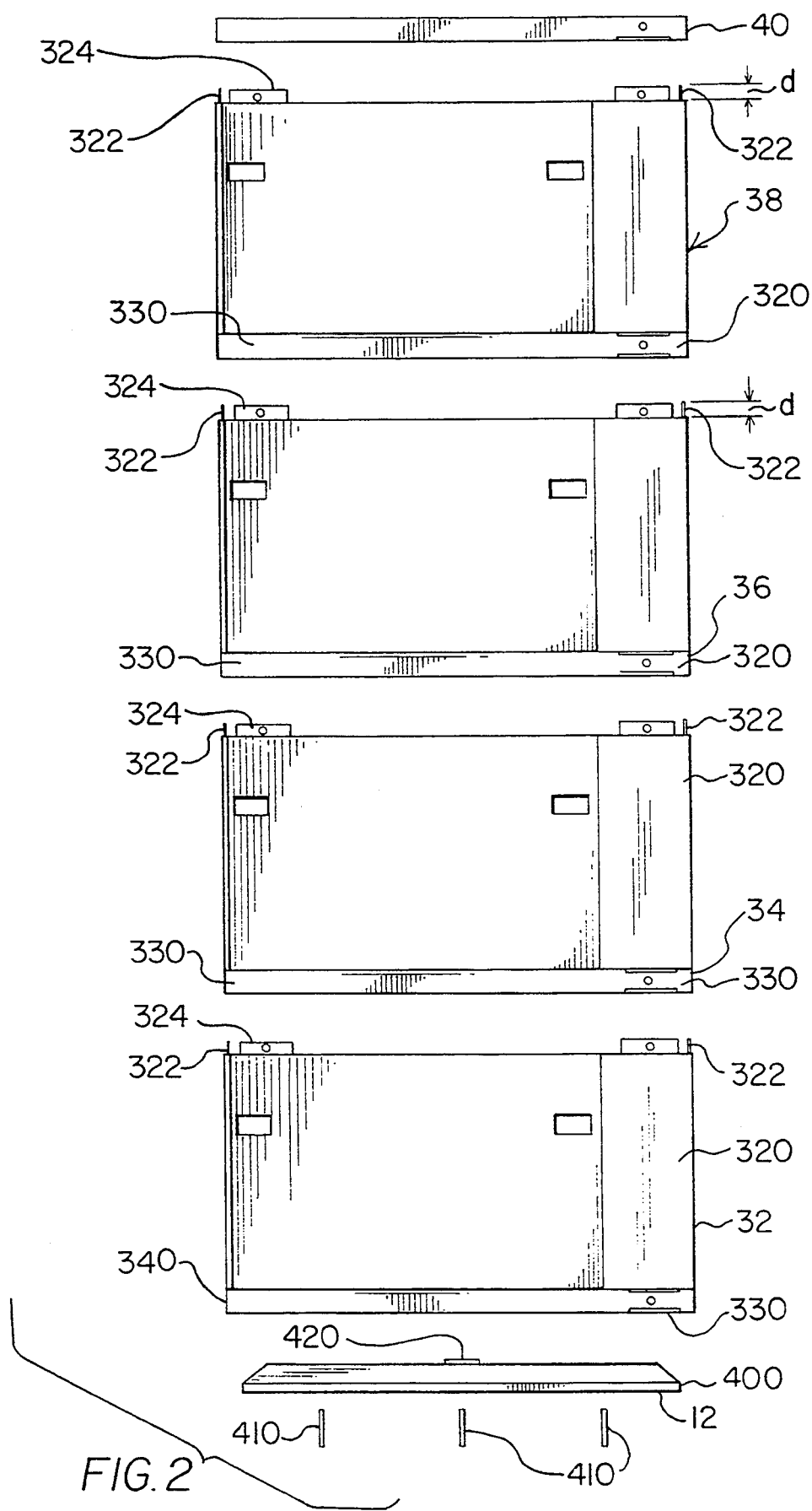
FIG. 2 is a front exploded view of the carousel of FIG. 1.
Figure 3:
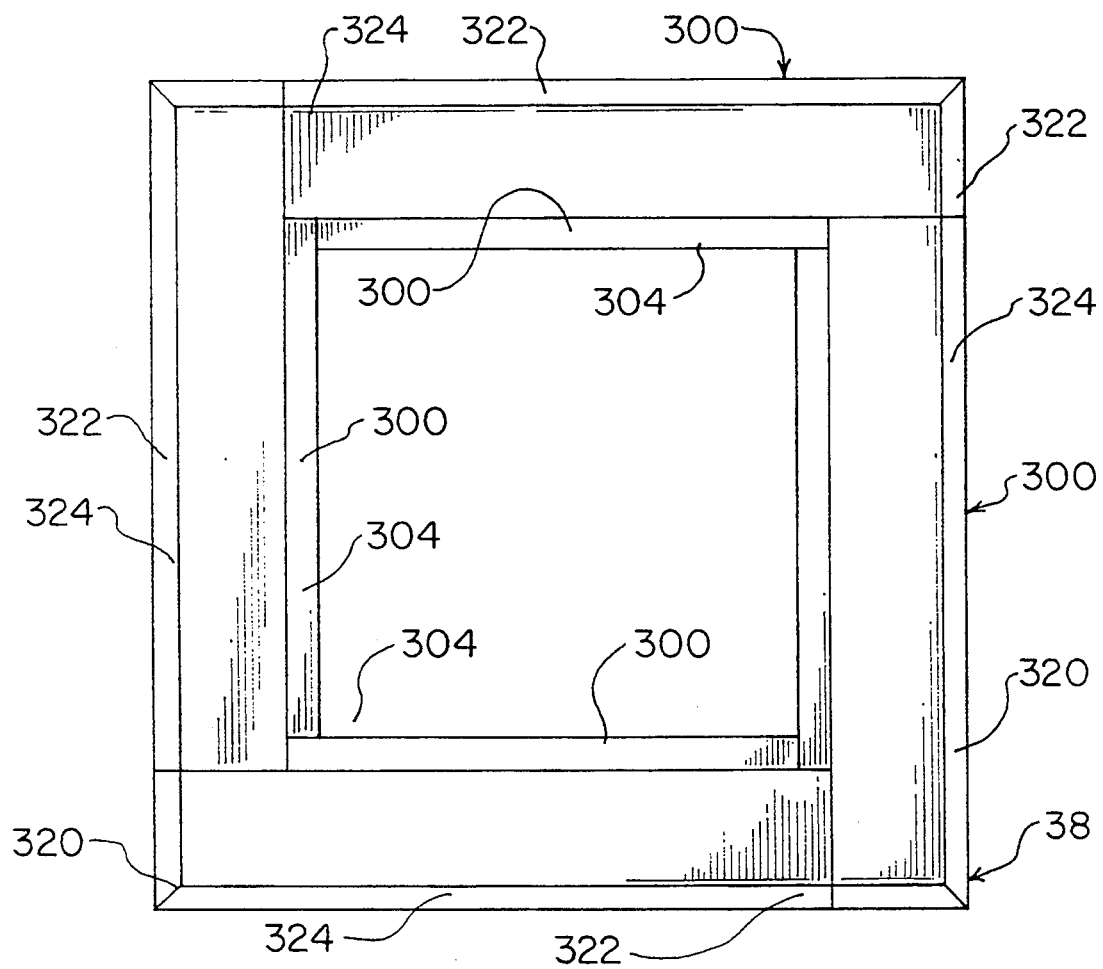
FIG. 3 is a top view of a modular unit of FIG. 1.

The present invention provides a modular stacking data storage media system to provide an efficient storage site for data storage media. This system enables the storage site to be specifically sized for the desired capacity as well as adapted as the capacity needs change. One preferred embodiment of the present invention is illustrated in FIGS. 1–3. It is to be expressly understood that this descriptive embodiment is intended for explanatory purposes only and is not meant to limit the scope of the inventive concept.

Modular carousel system 10, shown in FIG. 1, includes base unit 12 mounted on pedestal feet 14, 16, 18, 20 (all of which are not shown). Substantially square storage unit 30 is rotatably mounted on base unit 12, discussed in detail below. Storage unit 30 includes modular units 32, 34, 36, 38, stacked on one another. Top plate member 40 engages uppermost modular unit 38 as discussed below.

Compartments 300 are formed in each of the sides of each of modular units 32–38. Rear wall 304 in each of compartments 300 includes apertures 310 horizontally aligned. Suspension members on the Auto-Extreme ™ pack systems engage in apertures 310 similar to the engagement of the tape cartridge storage packs disclosed in co-pending application Ser. No. 07/786,087, filed on Oct. 31, 1991 and incorporated herein by reference.

Compartments 300, in the exemplary embodiment, are designed to securely hold eight millimeter tape cartridge holders, four millimeter tape cartridge holders as well as optical disk holders similar to the optical disk holder disclosed in co-pending application Ser. No.

07/986,103, filed on Dec. 4, 1992 and incorporated herein by reference.

Each of modular units 32-38, shown in FIG. 2, are identically formed. Compartments 32, 34, 36, 38 each include four substantially-identical front surfaces 320. As discussed above, compartments 300 are formed in front surfaces 320. In one embodiment shown in FIG. 3, compartments 300 are formed as separable boxes which are affixed together to form modular units. The modular units include certain features regardless of the manner of forming the modular units. Shoulder portion 322, shown in FIGS. 2 and 3, extends inwardly from the upper end of front surfaces 320 for a distance substantially equal to the thickness of front surface 320. Flange portion 324 extends substantially upwardly from shoulder portion 322 distance "d".

Lower recessed portion 330, shown in outline in FIG. 2, is formed behind front surface 320 extending upwardly a distance equal to or greater than distance "d". This allows flange portion 324 to engage in lower recessed portion 330 of the modular unit stacked above it. Shoulder portion 322 provides a positive stop from the lower end of the above stacked modular unit to ensure even engagement of the modular units. The combination of flange portion 324, the spacing of shoulder portion 322, and lower recessed portion 330 provide a secure engagement of the modular units.

Lower plate member 400, shown in FIG. 2 includes lower surface 402 and upper surface 404. Upper surface is affixed onto lower surface 340 of modular unit 30 by screws or other well-known affixing methods. Roller ball bearings 410 are mounted between lower plate member 400 and base unit 12. Alternatively, roller ball bearings 410 can be rotatably affixed to one of lower plate member 400 and base unit 12. Central bolt 420 rotatably secures lower plate member 400 and base unit 12 together.

Lower plate member 400 can be secured to the lowermost modular unit. Additional modular units can be stacked on one another to achieve the desired capacity level. Top plate member 40, which includes a recessed portion similar to lower recess portion 330 of the modular units is then affixed onto the uppermost modular unit in a manner similar to the modular units. If additional capacity is later needed or if less capacity is needed, then modular units can be added or removed.

The present invention is thus able to provide an adaptable staging system for data storage media. Other embodiments include a stationary multiple sided stacking system. Additionally, shapes other than square sided systems can be used.

We claim:

1. A storage system for data storage media, said storage system comprising:
    a base unit;
    a plurality of modular units having an upper end and a lower end;
    front surfaces around the perimeter of said modular units;
    said lower ends having a recessed portion behind said front surfaces;
    said upper ends include an upstanding flange portion extending parallel to said front surfaces and recessed therefrom to engage in said recessed portion of said lower end to enable said modular units to securely vertically stack on one another; and
    at least one compartment on each of said modular units for storing data storage media.

2. The storage system of claim 1 wherein said storage system includes:
    bearing means on said base unit for engaging the lowermost of said modular units.

3. The storage system of claim 1 wherein said modular units include:
    a front surface perimeter having four sides;
    at least one compartment in each of said sides of said front surface;
    means in each of said compartments for engaging data storage media.

4. The storage system of claim 1 wherein said storage system includes:
    a top plate member having a recessed lower portion for engaging said flange portion of the uppermost of said modular units.

5. A storage system for data storage media, said storage system comprising:
    a base unit;
    a plurality of modular units having upper end and a lower end;
    said upper ends on each of said modular units having means for securely engaging said lower ends of another of said modular units;
    each of said modular units having a front surface perimeter having four sides;
    at least one compartment in each of said sides of said front surfaces;
    at least one rear support member in each of said compartments;
    apertures aligned on said at least one support member for engaging rear suspension members on removable data storage media holders for securely holding the data storage media holders in said compartments.

* * * * *